(No Model.)
C. E. CAMPBELL.
ASH PAN.
No. 576,546. Patented Feb. 9, 1897.
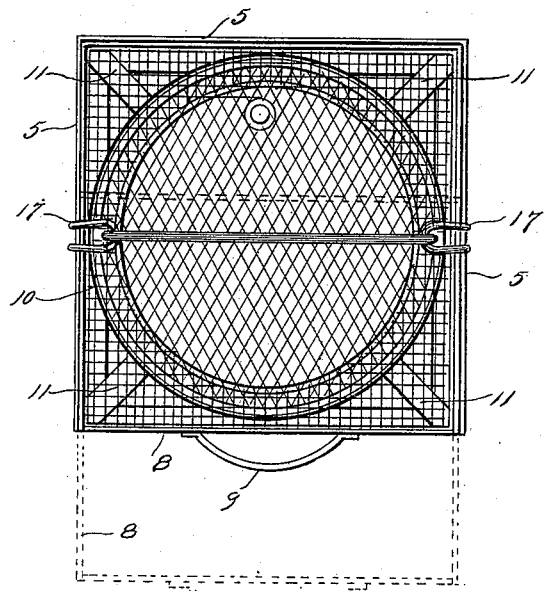
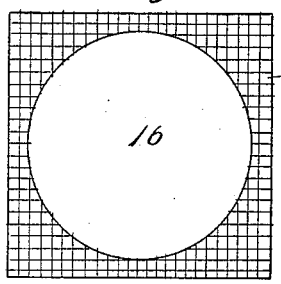
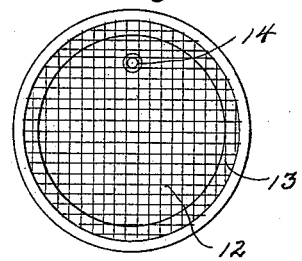
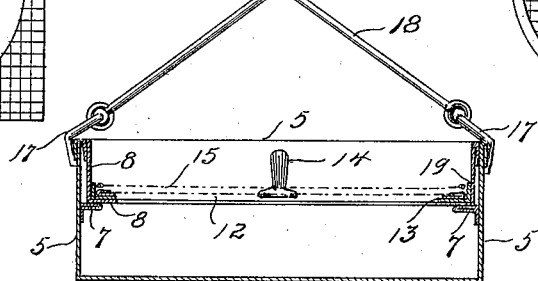
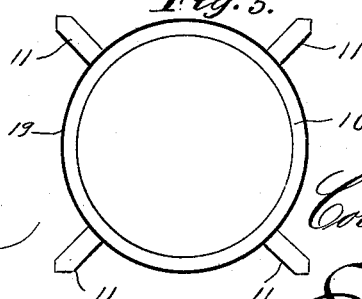
WITNESSES
INVENTOR
Cora E. Campbell
by Edgar Tate & Co.
ATTORNEYS.

UNITED STATES PATENT OFFICE.

CORA E. CAMPBELL, OF SCHENECTADY, NEW YORK.

ASH-PAN.

SPECIFICATION forming part of Letters Patent No. 576,546, dated February 9, 1897.

Application filed June 4, 1896. Serial No. 594,324. (No model.)

*To all whom it may concern:*

Be it known that I, CORA E. CAMPBELL, a citizen of the United States, and a resident of Schenectady, in the county of Schenectady and State of New York, have invented certain new and useful Improvements in Ash-Pans, of which the following is a specification, reference being had to the accompanying drawings, forming a part thereof, in which similar numerals of reference indicate corresponding parts.

This invention, which is a combination ash-pan and coal-sieve, relates to ash-pans for stoves, furnaces, &c., and the object thereof is to provide means by which the ashes may be separated from the cinders, charred coal, &c., before leaving the stove or furnace.

The invention is fully disclosed in the following specification, of which the accompanying drawings form a part, in which—

Figure 1 is a plan view of my combination ash-pan and ash-sieve, showing in dotted lines a drawer, which forms a part thereof, partly withdrawn; Fig. 2, a central transverse section thereof; Figs. 3 and 4, different forms of screen employed; Fig. 5, a circular support upon which one of the screens is mounted In the practice of my invention I provide a pan which is rectangular in form and preferably square, and which consists of suitable sides 5 and a bottom 6, and placed in said pan at the opposite sides thereof are cleats or strips 7, on which rests the sliding drawer 8, provided with a handle 9. Said drawer is provided with a central opening, and placed thereon is a metal ring 10, which is provided with four arms or projections 11, which project into the corners of the pan and rest upon and are fastened to the cleats or strips 7.

Mounted upon the ring 10 and revoluble thereon is a circular screen 12, which consists of a metal ring 13, to which the screen is secured, and said screen is provided with an upwardly-directed post 14, by which the sieve may be revolved or agitated by means of a removable shaker or handle, and placed over the screen 12 and the ring 10, by which it is supported, is a square screen 15, which is provided with a central opening 16, and the object of the screen 15 is to close the corner spaces outside of the screen 12 and across which the arms 11 of the ring 10 project.

Secured to the sides of the pan are ears 17, which preferably extend inwardly, as shown in Fig. 2, and pivotally connected therewith is a bail 18.

The operation will be readily understood from the foregoing description when taken in connection with the accompanying drawings and the following statement thereof.

The ring 10 is provided with an upwardly-directed annular flange 19, and in operation the ashes, cinders, charred coal, and similar articles drop from the fire-box of the stove or furnace upon the screens 15 and 12, and the screen 12 is agitated by means of the post 14 and the removable shaker or handle, and the ashes are sifted through the screens 12 and 15 into the ash-pan underneath, and the cinders, charred coal, and other coarse articles remain upon the screen and may be removed by withdrawing the drawer 8, of which said screens form the bottom, and ashes in ash-pan may also be removed at same time or whenever necessary, as will be readily understood.

This invention, which is a valuable labor-saving device, is simple in construction and operation and perfectly adapted to accomplish the result for which it is intended. It is also comparatively inexpensive.

Having fully described my invention, I claim and desire to secure by Letters Patent—

1. A combination ash-pan and ash-sieve, comprising a pan having side cleats or strips and provided with an open bottom, a ring mounted within said sliding drawer, and having arms secured thereto, said arms being adapted to rest on said cleats and snugly fit in the corner of said pan, and supported over the open bottom thereof, and two screens above said ring, one of which is circular in form and placed upon said ring, and being revoluble thereon, and the other screen being square in form and provided with a central circular opening, substantially as shown and described.

2. A combination ash-pan and ash-sieve, consisting of a rectangular pan in which is placed a sliding drawer, said drawer being provided with an open bottom and a ring mounted thereon and provided with projecting arms which extend into the corners of said drawer, and by which said ring is supported, a circular screen mounted over and revoluble upon said ring, and a square screen which is placed above said circular screen, said circular screen being provided with an upright post near the front edge, by which it may be agitated or revolved, the ash-pan and cinder pan or sieve both being provided with bails and handles, suitably secured thereto, substantially as shown and described.

In testimony that I claim the foregoing as my invention I have signed my name, in presence of the subscribing witnesses, this 29th day of May, 1896.

CORA E. CAMPBELL.

Witnesses:
EDWARD D. CUTLER,
MARY B. SMITH.